(12) United States Patent
Zhang et al.

(10) Patent No.: US 11,995,796 B2
(45) Date of Patent: May 28, 2024

(54) METHOD OF RECONSTRUCTION OF SUPER-RESOLUTION OF VIDEO FRAME

(71) Applicant: Nanjing University of Posts and Telecommunications, Nanjing (CN)

(72) Inventors: Dengyin Zhang, Nanjing (CN); Chao Zhou, Nanjing (CN); Can Chen, Nanjing (CN); Junjiang Li, Nanjing (CN); Zijie Liu, Nanjing (CN); Yi Cheng, Nanjing (CN)

( * ) Notice: Subject to any disclaimer, the term of this patent is extended or adjusted under 35 U.S.C. 154(b) by 388 days.

(21) Appl. No.: 17/529,203

(22) Filed: Nov. 17, 2021

(65) Prior Publication Data

US 2022/0261959 A1    Aug. 18, 2022

Related U.S. Application Data

(63) Continuation-in-part of application No. PCT/CN2021/123605, filed on Oct. 13, 2021.

(30) Foreign Application Priority Data

Feb. 8, 2021    (CN) .......................... 202110170643.0

(51) Int. Cl.
  *G06T 3/4053*    (2024.01)
  *G06N 3/045*    (2023.01)
  *G06N 3/048*    (2023.01)
  *G06T 3/4046*    (2024.01)

(52) U.S. Cl.
  CPC .......... *G06T 3/4053* (2013.01); *G06N 3/045* (2023.01); *G06N 3/048* (2023.01); *G06T 3/4046* (2013.01)

(58) Field of Classification Search
  CPC ..... G06T 3/4053; G06T 3/4046; G06N 3/045; G06N 3/048; G06N 3/08; G06N 3/0464; G06F 18/214; G06F 18/25; G06V 20/41; G06V 20/46
  See application file for complete search history.

(56) References Cited

U.S. PATENT DOCUMENTS

2021/0241470 A1*  8/2021  Tang .................... G06V 10/764

FOREIGN PATENT DOCUMENTS

| CN | 111583112 A | * | 8/2020 |
| CN | 111260560 B | * | 12/2020 |
| CN | 111968064 B | * | 1/2021 |

OTHER PUBLICATIONS

CN 111583112 translation (Year: 2020).*
(Continued)

*Primary Examiner* — Carol Wang

(57) ABSTRACT

A method of reconstruction of super-resolution of video frame includes inputting a first video frame with a first resolution and a plurality of consecutive frames thereof into a pre-trained super-resolution reconstruction network, and outputting, by the pre-trained super-resolution reconstruction network, a second video frame with a second resolution corresponding to the first video frame. The second resolution is higher than the first resolution. The super-resolution reconstruction network includes a feature extraction subnetwork, a spatial-temporal non-local alignment subnetwork, an attention progressive fusion subnetwork, and an up-sampling subnetwork which are connected in sequence.

9 Claims, 4 Drawing Sheets

(56) References Cited

OTHER PUBLICATIONS

Wang, Hua, Dewei Su, Chuangchuang Liu, Longcun Jin, Xianfang Sun, and Xinyi Peng. "Deformable non-local network for video super-resolution." IEEE Access 7 (2019): 177734-177744. (Year: 2019).*

Su, Dewei, Hua Wang, Longcun Jin, Xianfang Sun, and Xinyi Peng. "Local-global fusion network for video super-resolution." IEEE Access 8 (2020): 172443-172456. (Year: 2020).*

Zhou, Chao, Can Chen, Fei Ding, and Dengyin Zhang. "Video super-resolution with non-local alignment network." IET Image Processing 15, No. 8 (2021): 1655-1667. (Year: 2021).*

* cited by examiner

METHOD OF RECONSTRUCTION OF SUPER-RESOLUTION OF VIDEO FRAME

CROSS-REFERENCE TO RELAYED APPLICATIONS

This application is a continuation-in-part of International Patent Application No. PCT/CN2021/123605 with an international filing date of Oct. 13, 2021, designating the United States, now pending, and further claims foreign priority benefits to Chinese Patent Application No. 202110170643.0 filed Feb. 8, 2021. The contents of all of the aforementioned applications, including any intervening amendments thereto, are incorporated herein by reference. Inquiries from the public to applicants or assignees concerning this document or the related applications should be directed to: Matthias Scholl P C., Attn.: Dr. Matthias Scholl Esq., 245 First Street, 18th Floor, Cambridge, MA 02142.

BACKGROUND

The disclosure relates to the field of video processing, and more particularly to a method of reconstruction of super-resolution of a video frame.

With the rapid development of information society, the demand for high-resolution video is increasing. Video super-resolution technology, which converts low-resolution videos into high-resolution videos, has emerged and is widely used in communication, surveillance, remote sensing, entertainment and medical treatment. With the rapid development of deep learning in recent years, Deep Neural Network (DNN) has become a mainstream method in super-resolution research because of its powerful nonlinear representation ability.

Existing research on the super-resolution of a single image mainly focuses on how to design an effective network structure to make full use of internal features of the image, namely spatial correlation, so as to improve the reconstruction quality. For example, a residual network, a dense network and an attention mechanism all bring considerable gains to the improvement of reconstruction quality.

Compared with the single image, video sequences possess higher temporal correlation in addition to spatial correlation. How to exploit the temporal correlation of video sequences is the main research focus of video super-resolution reconstruction algorithm. However, exploiting the temporal correlation of video sequences often requires solving problems such as frame-to-frame occlusion, fast motion, and motion blur. Existing video super-resolution algorithms solve the above problems mainly by two steps: alignment and fusion. In the alignment step, the existing methods mainly adopt motion estimation/motion compensation, but motion estimation/motion compensation often leads to poor reconstruction results due to insufficient accuracy. In the fusion step, the existing methods lack the punishment for low-quality features and the incentive for high-quality features in a progressive framework. Therefore, the existing video super-resolution reconstruction algorithms still have some shortcomings in fidelity and robustness of reconstruction, which often leads to blurring and distortion of reconstructed videos.

SUMMARY

The disclosure provides a method of reconstruction of super-resolution of a video frame, the method comprising: inputting a first video frame with a first resolution and a plurality of consecutive frames thereof into a pre-trained super-resolution reconstruction network, and outputting, by the pre-trained super-resolution reconstruction network, a second video frame with a second resolution corresponding to the first video frame, where the second resolution is higher than the first resolution.

The super-resolution reconstruction network comprises a feature extraction subnetwork, a spatial-temporal non-local alignment subnetwork, an attention progressive fusion subnetwork and an up-sampling subnetwork which are connected in sequence.

In a class of this embodiment, a training method of the super-resolution reconstruction network comprises:
  acquiring a training sample set, where the training sample set comprises a plurality of high resolution-low resolution video sequence pairs each comprising 2N+1 third consecutive video frames and a fourth video frame, where N is a positive integer;
  the third video frames are low in resolution, and the fourth video frame is high in resolution; the fourth video frame is a high-resolution intermediate frame of the 2N+1 third video frames, which is an $N+1^{th}$ frame;
  inputting the 2N+1 third video frames into the feature extraction subnetwork to obtain extracted features of the 2N+1 third video frames output by the subnetwork;
  inputting the extracted features of the 2N+1 third video frames into the spatial-temporal non-local alignment subnetwork to obtain aligned extracted features of the 2N+1 third video frames;
  inputting the aligned extracted features of the 2N+1 third video frames and an extracted feature of the intermediate frame of the 2N+1 third video frames into the attention progressive fusion subnetwork to obtain a first fused feature of the intermediate frame;
  transforming the dimension of the first fused feature of the intermediate frame by the up-sampling subnetwork to obtain a second fused feature of the intermediate frame, where the second fused feature of the intermediate frame is in the same dimension as the fourth video frame;
  interpolating the intermediate frame of the 2N+1 third video frames to obtain an interpolated intermediate frame which is in the same dimension as the fourth video frame;
  superimposing the second fused feature of the intermediate frame and the interpolated intermediate frame to obtain a first output frame; and
  updating the super-resolution reconstruction network to make the first output frame converge to the fourth video frame.

In a class of this embodiment, the feature extraction subnetwork is a convolution network with N_fe convolution layers.

In a class of this embodiment, inputting the extracted features of the 2N+1 third video frames into the spatial-temporal non-local alignment subnetwork to obtain aligned extracted features of the 2N+1 third video frames comprises:
  inputting the extracted features of the 2N+1 third video frames into the spatial-temporal non-local alignment subnetwork; and
  acquiring, by the spatial-temporal non-local alignment subnetwork, weighted sum features of the extracted features of the 2N+1 third video frames, as well as the aligned extracted features of the 2N+1 third video frames based on the extracted feature of the intermediate frame of the 2N+1 third video frames and the weighted sum features.

In a class of this embodiment, before the spatial-temporal non-local alignment subnetwork acquires the weighted sum features of the extracted features of the 2N+1 third video frames, the method further comprises transforming the dimension of the extracted features of the 2N+1 third video frames from a first dimension to a second dimension.

After the weighted sum features are acquired, the method further comprises transforming the dimension of the weighted sum features from the second dimension to the first dimension.

In a class of this embodiment, the attention progressive fusion subnetwork comprises N_apf attention progressive fusion blocks connected in sequence; the N_apf attention progressive fusion blocks comprise a first attention progressive fusion block comprising 2N+2 first convolution layers, 2N+2 second convolution layers, and a temporal attention module;

the first fused feature of the intermediate frame is obtained as follows:

inputting features corresponding to the 2N+1 third video frames and a feature of the intermediate frame of the 2N+1 third video frames into the 2N+2 first convolution layers respectively, inputting all output features into the temporal attention module to obtain an integrated feature of the intermediate frame; cascading the integrated feature of the intermediate frame with the features corresponding to the 2N+1 third video frames and the feature corresponding to the intermediate frame of the 2N+1 third video frames, inputting all cascaded features into the 2N+2 second convolution layers, superimposing convoluted features obtained with the features corresponding to the 2N+1 third video frames and the feature of the intermediate frame of the 2N+1 third video frames, respectively, and outputting all superimposed features;

when the first attention progressive fusion block is arranged at the head of the N_apf attention progressive fusion blocks connected in sequence, the features corresponding to the 2N+1 third video frames are the aligned extracted features of the 2N+1 third video frames, and the feature of the intermediate frame of the 2N+1 third video frames is the extracted feature of the intermediate frame of the 2N+1 third video frames;

when the first attention progressive fusion block is not arranged at the head of the N_apf attention progressive fusion blocks connected in sequence, the features corresponding to the 2N+1 third video frames and the feature of the intermediate frame of the 2N+1 third video frames are the superimposed features output by an attention progressive fusion block arranged before the first attention progressive fusion block; and when the first attention progressive fusion block is arranged at the end of the N_apf attention progressive fusion blocks connected in sequence, the first attention progressive fusion block further comprises a third convolution layer; and the first attention progressive fusion block cascades the superimposed features, inputs the cascade features obtained into the third convolution layer, and takes the features output by the third convolution layer as the features output by the attention progressive fusion subnetwork.

In a class of this embodiment, inputting all output features into the temporal attention module to obtain an integrated feature of the intermediate frame comprises:

calculating, by the temporal attention module, the output features corresponding to the 2N+1 third video frames and the output feature corresponding to the intermediate frame of the 2N+1 third video frames respectively to obtain similar features in the above output features, multiplying the obtained similar features by the output features corresponding to the 2N+1 third video frames respectively, and cascading the features after multiplication to obtain the integrated feature of the intermediate frame.

In a class of this embodiment, the similar features are calculated based on a sigmoid function.

In a class of this embodiment, the super-resolution reconstruction network is trained in two stages comprising a first stage and a second stage, where the temporal attention module is blocked in the first stage and unblocked in the second stage; and the first stage and the second stage are switched based on whether a default convergence threshold is reached in the first stage.

In a class of this embodiment, the up-sampling subnetwork is a convolution network.

The flowing advantages are associated with the method of reconstruction of super-resolution of a video frame.

Since the Deep Neural Network (DNN) has extremely fast feedforward speed, the super-resolution video frame reconstruction method provided in the embodiment of the disclosure has faster reconstruction speed than traditional optimization-based methods, and is suitable for application scenarios with high real-time requirements.

Compared with other video super-resolution networks, the spatial-temporal non-local alignment subnetwork adopted in the method can integrate global information of the consecutive frames, and align such information to every point of the intermediate frame, so as to make full use of information at every point of the consecutive frames. At the same time, this subnetwork makes use of the temporal correlation of the consecutive frames, and also makes full use of the spatial correlation by performing non-local operations on the intermediate frame. Therefore, this method can better utilize the spatial-temporal correlation to integrate and align the information of the consecutive frames, i.e., the intermediate frame, and improve the alignment effect.

Compared with other video super-resolution networks, a subnetwork based on attention progressive fusion adopted in the disclosure can progressively and repeatedly fuse multiple frames, and punish low-quality features at each time of fusion by an attention mechanism, thus improving the final effect of progressive fusion.

DETAILED DESCRIPTION

To further illustrate the disclosure, embodiments detailing a method of reconstruction of super-resolution of a video frame are described below. It should be noted that the following embodiments are intended to describe and not to limit the disclosure.

As mentioned above, existing video super-resolution reconstruction algorithms have some shortcomings in fidelity and robustness of reconstruction, which leads to blurring and distortion of reconstructed videos and thus to poor user experience.

To solve the above technical problems, a method of reconstruction of super-resolution of video frame is provided according to an embodiment of the disclosure, which is detailed as follows.

A first video frame with a first resolution and a plurality of consecutive frames thereof are input into a pre-trained super-resolution reconstruction network configured to output a second video frame with a second resolution corresponding to the first video frame. The second resolution is higher than the first resolution.

The super-resolution reconstruction network comprises a feature extraction subnetwork, a spatial-temporal non-local alignment subnetwork, an attention progressive fusion subnetwork and an up-sampling subnetwork which are connected in sequence.

Figure 1:
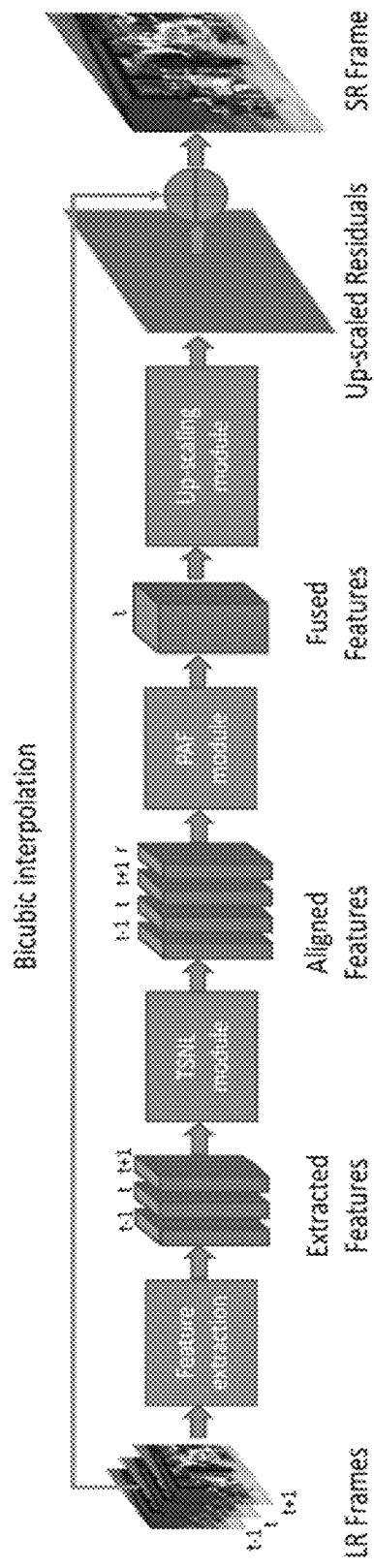
FIG. 1 is a schematic diagram of a method of reconstruction of super-resolution of video frame according to an embodiment of the disclosure.

As shown in FIG. 1, a training method of the super-resolution reconstruction network may comprise following steps A to H.

In step A, a training sample set is acquired. The training sample set comprises a plurality of high resolution-low resolution video sequence pairs each comprising 2N+1 third consecutive video frames and a fourth video frame, where N is a positive integer. The third video frames are low in resolution, and the fourth video frame is high in resolution. The fourth video frame is a high-resolution intermediate frame of the 2N+1 third video frames, which is an N+1$^{th}$ frame.

In step B, the 2N+1 third video frames are input into the feature extraction subnetwork to obtain extracted features of the 2N+1 third video frames output by the subnetwork. In one specific embodiment, the feature extraction subnetwork may be a convolution network with N_fe convolution layers. In other words, this subnetwork separately extracts the features of each low-resolution frame input, i.e., when features are inputted into the convolution network with N_fe convolution layers, the extracted features of the 2N+1 frames are output.

In step C, the extracted features of the 2N+1 third video frames are input into the spatial-temporal non-local alignment subnetwork to obtain aligned extracted features of the 2N+1 third video frames.

In one specific embodiment, the extracted features of the 2N+1 third video frames may be input into the spatial-temporal non-local alignment subnetwork. For example, the number of consecutive frames is 2N=6, the total number of frames input is 2N+1=7, the number of convolution layers for feature extraction is N_fe=5, and the number of attention progressive fusion blocks is N_apf=20.

The spatial-temporal non-local alignment subnetwork acquires weighted sum features of the extracted features of the 2N+1 third video frames, as well as the aligned extracted features of the 2N+1 third video frames based on the extracted feature of the intermediate frame of the 2N+1 third video frames and the weighted sum features.

In one specific embodiment, before the spatial-temporal non-local alignment subnetwork acquires the weighted sum features of the extracted features of the 2N+1 third video frames, the dimension of the extracted features of the 2N+1 third video frames may be transformed from a first dimension to a second dimension. Also, after the weighted sum features are acquired, the dimension of the weighted sum features may be transformed from the second dimension to the first dimension.

Figure 2:
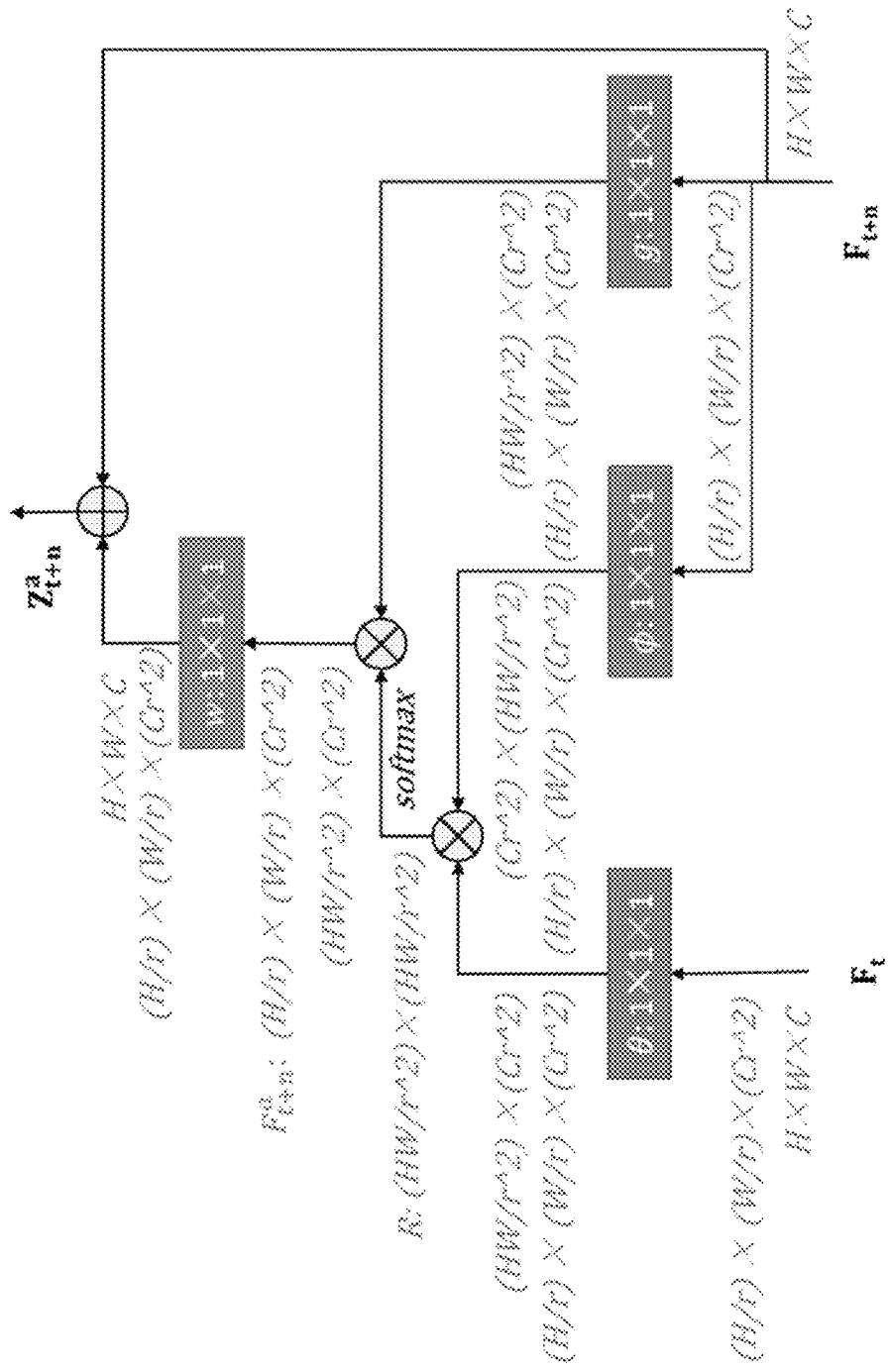
FIG. 2 is a schematic diagram of a feature extraction subnetwork according to an embodiment of the disclosure.

In one more specific embodiment, as shown in FIG. 2, After the feature $F_t$ of the intermediate frame and the feature $F_{t+n}$(|n|≤N) of each consecutive frame (comprising the intermediate frame itself, $F_t$) are input, this subnetwork outputs the aligned features of the consecutive frames. Specifically, the dimension of all feature tensors $F_{t+n}$(|n|≤N) is first transformed from H×W×C to (H/r)×(W/r)×Cr$^2$, where H, W and C are the height, width and channel number of the first dimension, respectively, and r is an integer greater than 1. The purpose of the transformation is to reduce the memory required for network computing. Then, each point in the $F_{t+n}$ after transformation is calculated by following formula:

$$y_i = \frac{1}{C(x)} \Sigma_{\forall j} f(r_i, x_j) g(x_j) \tag{1}$$

where i is a subscript of this point, $r_i$ and $x_j$ represent points in $F_t$ and $F_{t+n}$, and $f(r_i, x_i)$ is a binary function, which may be set as $e^{\theta(x_i)^T \phi(x_j)}$, where $\theta(x_i)$ and $\phi(x_j)$ are two linear unary functions implemented by convolution layers for calculating the correlation between the two points. $g(x_j)$ is a linear mapping function, C(x) is a normalized function, which may be set as $\Sigma_{\forall j} f(r_i, x_i)$, and may be implemented by softmax in the network. $y_i$ represents a feature to which this point is aligned. This feature is a weighted sum of all points in the consecutive frames, and the weight is determined by calculating the correlation with the points in the intermediate frame by $f(r_i, x_i)$. Finally, $y_i$ is input into a convolution layer, transformed to its original dimension, and output after being added to $x_j$, as shown in following formula:

$z_i = w(y_i) + x_j$, where the $w(y_i)$ function contains a convolution layer and transformation operations.

In step D, the aligned extracted features of the 2N+1 third video frames and the extracted feature of the intermediate frame of the 2N+1 third video frames are input into the attention progressive fusion subnetwork to obtain a first fused feature of the intermediate frame.

In one specific embodiment, the attention progressive fusion subnetwork comprises N_apf attention progressive fusion blocks connected in sequence. The N_apf attention progressive fusion blocks comprise a first attention progressive fusion block comprising 2N+2 first convolution layers, 2N+2 second convolution layers, and a temporal attention module.

According to the operations of the first attention progressive fusion block, the method may comprise following steps of inputting features corresponding to the 2N+1 third video frames and a feature of the intermediate frame of the 2N+1 third video frames into the 2N+2 first convolution layers respectively, inputting all output features into the temporal attention module to obtain an integrated feature of the intermediate frame; cascading the integrated feature of the intermediate frame with the features corresponding to the 2N+1 third video frames and the feature corresponding to the intermediate frame of the 2N+1 third video frames, inputting all cascaded features into the 2N+2 second convolution layers, superimposing convoluted features obtained with the features corresponding to the 2N+1 third video frames and the feature of the intermediate frame of the 2N+1 third video frames, respectively, and outputting all superimposed features.

When the first attention progressive fusion block is arranged at the head of the N_apf attention progressive fusion blocks connected in sequence, the features corresponding to the 2N+1 third video frames are the aligned extracted features of the 2N+1 third video frames, and the feature of the intermediate frame of the 2N+1 third video frames is the extracted feature of the intermediate frame of the 2N+1 third video frames.

When the first attention progressive fusion block is not arranged at the head of the N_apf attention progressive fusion blocks connected in sequence, the features corresponding to the 2N+1 third video frames and the feature of the intermediate frame of the 2N+1 third video frames are the superimposed features output by an attention progressive fusion block arranged before the first attention progressive fusion block.

When the first attention progressive fusion block is arranged at the end of the N_apf attention progressive fusion blocks connected in sequence, the first attention progressive fusion block further comprises a third convolution layer; and the first attention progressive fusion block cascades the superimposed features, inputs the cascade features obtained into the third convolution layer, and takes the features output by the third convolution layer as the features output by the attention progressive fusion subnetwork.

In one example, the temporal attention module may calculate the output features corresponding to the 2N+1 third video frames and the output feature corresponding to the intermediate frame of the 2N+1 third video frames respectively to obtain similar features in the above output features, the obtained similar features are multiplied by the output features corresponding to the 2N+1 third video frames respectively, and the features after multiplication are cascaded to obtain the an integrated feature of the intermediate frame. In one example, the similar features may be calculated based on a sigmoid function.

Figure 3:
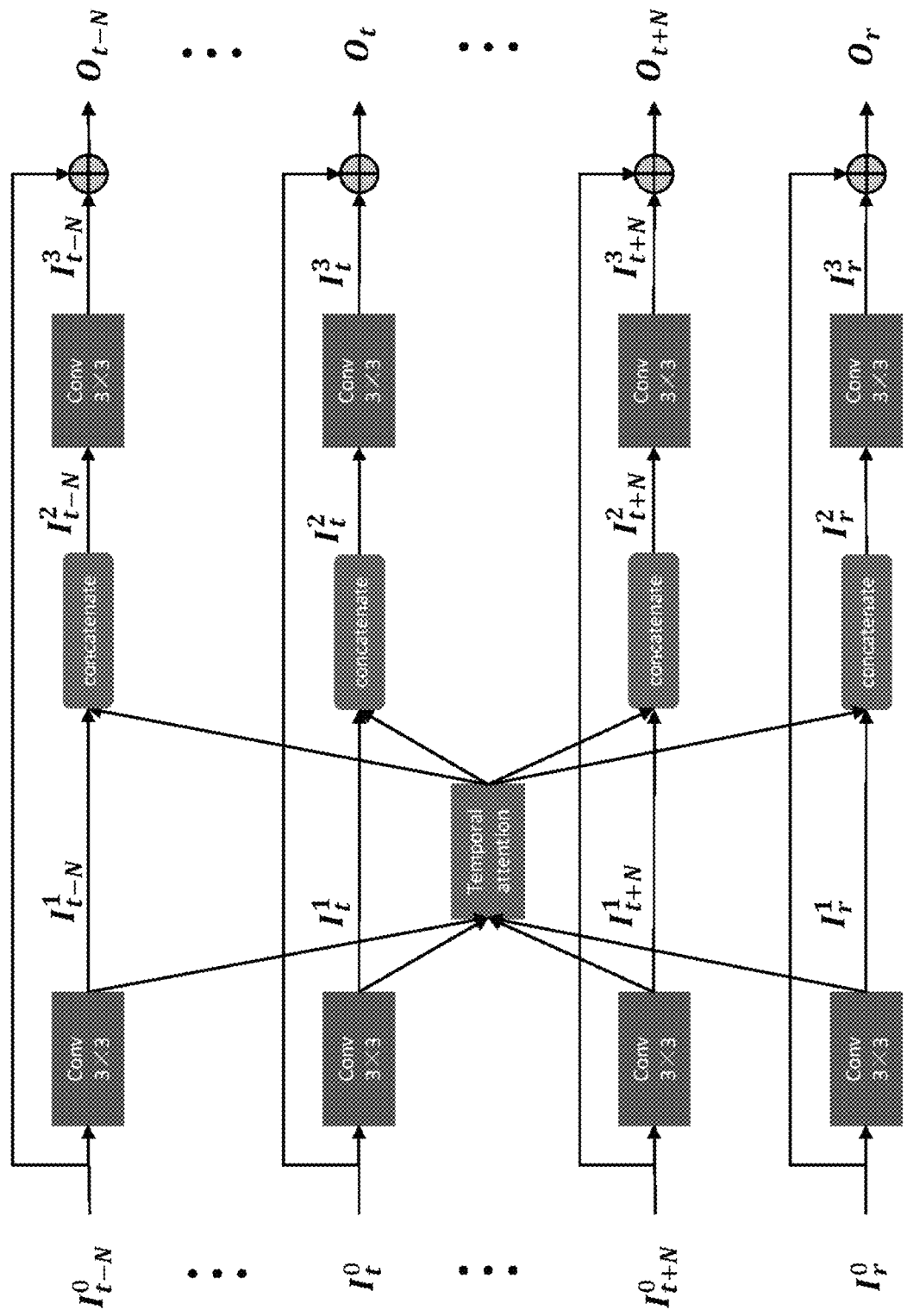
FIG. 3 is a schematic diagram of an attention progressive fusion block according to an embodiment of the disclosure.
Figure 4:
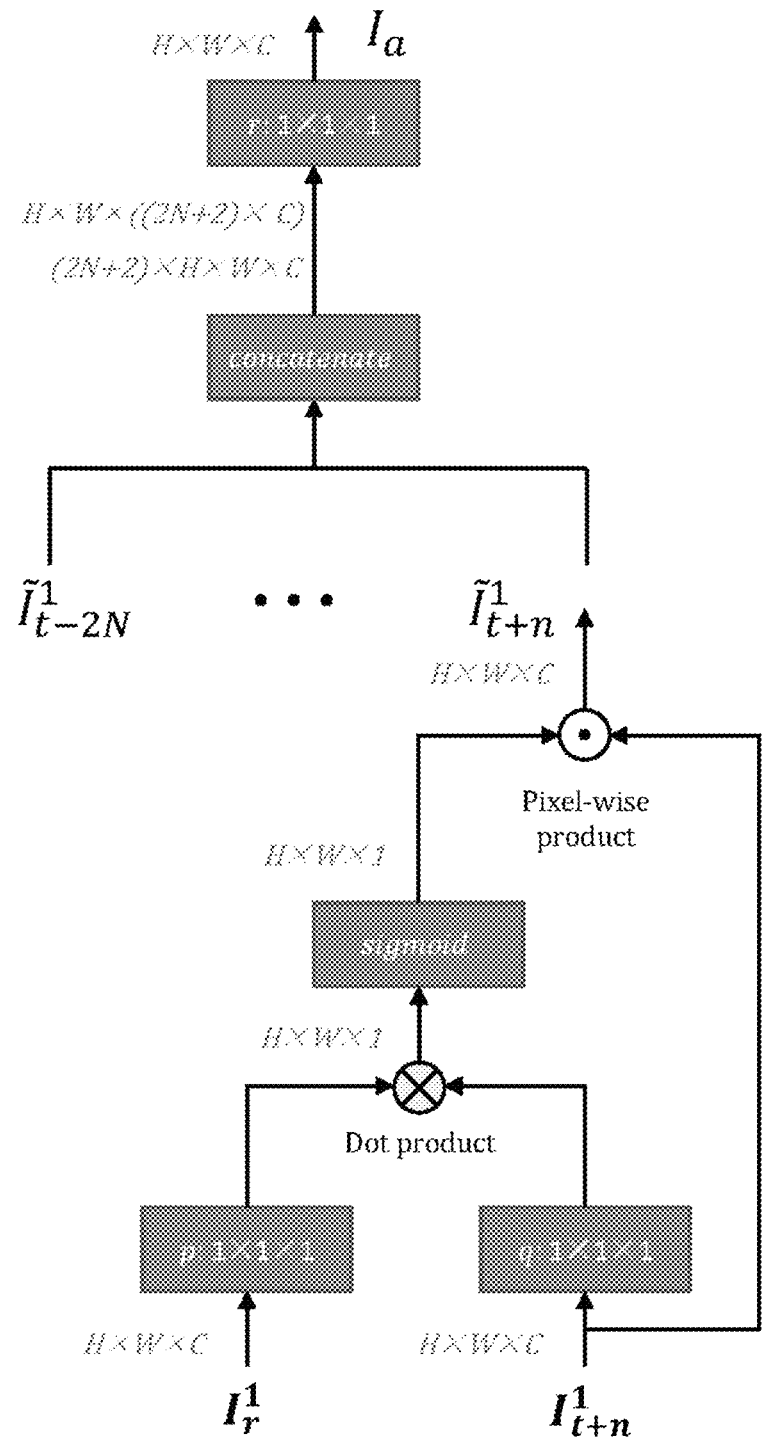
FIG. 4 is a schematic diagram of a temporal attention module according to an embodiment of the disclosure.

In one more specific embodiment, after (2N+1) aligned features of the consecutive frames and the feature of the intermediate frame output by the spatial-temporal non-local subnetwork are input into the attention progressive fusion subnetwork, the fused feature of the intermediate frame is output. This subnetwork is formed by cascading the N_apf attention progressive fusion blocks, and each block is shown in FIG. 3. In each block, each feature $I_{t+n}^0$ (comprising the feature $I_r^0$ of the intermediate frame) is input into a convolution layer $C_1$ separately to obtain $Q_{t+n}^1$ and $I_r^1$, which are input into the temporal attention module, i.e., FA( ), and the temporal attention module outputs the integrated feature $I_a$ of the intermediate frame. The feature $I_a$ of the intermediate frame is cascaded with the original features $Q_{t+n}^1$ and $I_r^1$, and input into the second convolution layer $C_2$ after refusion. Finally, $I_{t+n}^0$ and $I_r^0$ are added together and output to obtain fused consecutive frames $O_{t+n}$ and $O_r$ to be input into the next progressive fusion block for the next fusion. The whole process is shown by following formulas:

$$I_{t+n}^1 = C_1(I_{t+n}^0), n \in [-N,N] \quad (2);$$

$$I_r^1 = C_1(I_r^0) \quad (3);$$

$$I_a = FA(I_{t-N}^1, \ldots, I_{t+N}^1, I_r^1) \quad (4);$$

$$O_{t+n} = I_{t+n}^0 + C_2([I_{t+n}^1, I_a]) \quad (5);$$

$$O_r = I_r^0 + C_2([I_r^1, I_a]) \quad (6);$$

where the features $I_{t+n}^1$ of the 2N+2 consecutive frames (comprising the intermediate frame) and the features $I_r^1$ of the intermediate frame are input into the temporal attention module $FA(I_{r-N}^1, \ldots, I_{t+N}^1, I_r^1)$, the integrated feature $I_a$ of the intermediate frame is output, as shown in FIG. 4. Specifically, the similarity between each point in the consecutive frame $Q_{t+n}^1$ and the point corresponding to $I_r^1$ is first calculated:

$$S(I_r^1, I_{t+n}^1) = \text{sigmoid}(p(I_r^1)_T q(I_{t+n}^1)) \quad (7);$$

where $p(I_r^1)$ and $q(I_{t+n}^1)$ are two linear unary functions implemented by convolution layers. his similarity is multiplied by the original features $I_{t+n}^1$ pixel by pixel:

$$\tilde{I}_{t+n}^1 = S(I_r^1, I_{t+n}^1) \odot I_{t+n}^1 \quad (8);$$

where $\odot$ represents pixel-by-pixel multiplication. Finally, the frames $\tilde{I}_{t+n}^1$ are all cascaded and output by a convolution network to obtain $I_a$.

In the attention progressive fusion subnetwork, the features (comprising 2N+2 features) output by the last attention progressive fusion block are cascaded and then input into a convolution layer for integration as the features output by this subnetwork.

In step E, dimension transformation is performed on the first fused feature of the intermediate frame by the up-sampling subnetwork to obtain a second fused feature of the intermediate frame, where the second fused feature of the intermediate frame is in the same dimension as the fourth video frame. In one specific embodiment, the up-sampling subnetwork may be a convolution network.

In one more specific embodiment, using the convolution layers, the up-sampling subnetwork may perform dimension transformation on the channel number of the features output by the attention progressive fusion subnetwork, to increase the dimension from $H \times W \times C$ to $H \times W \times (c \cdot k^2)$ and then transform to $(k \cdot H) \times (k \cdot H) \times c$, where H, W and C are output dimensions of the attention progressive fusion subnetwork, k is a resolution magnification factor and c is the number of channels of the output frame. The above steps are repeated until a desired dimension is obtained by up-sampling.

In step F, the intermediate frame of the 2N+1 third video frames is interpolated to obtain an interpolated intermediate frame which is in the same dimension as the fourth video frame.

In step G, the second fused feature of the intermediate frame and the interpolated intermediate frame are superimposed to obtain a first output frame.

In one specific embodiment, bicubic interpolation is performed on the low-resolution intermediate frame to obtain the frame with a desired dimension, and the frame is added to the frame output by the up-sampling subnetwork to obtain the frames output by the network.

In step H, the super-resolution reconstruction network is updated to make the first output frame converge to the fourth video frame.

According to one embodiment, the super-resolution reconstruction network is trained in two stages, where the temporal attention module is blocked in the first stage and unblocked in the second stage. The first stage and the second stage are switched based on whether a default convergence threshold is reached in the first stage.

The effect of the method in the disclosure will be further described below with reference to a comparison table of experimental results.

TABLE 1

Comparison between the Reconstruction Quality of the Embodiment of the Disclosure and That of the Prior Art

| Sequence No. | VESPCN | RVSR-LTD | MCResNet | DRVSR | FRVSR | DUF_52L | PFNL | NLVSR |
|---|---|---|---|---|---|---|---|---|
| Archpeople | 35.37/0.9504 | 35.22/0.9488 | 35.45/0.9510 | 35.83/0.9547 | 36.20/0.9577 | 36.92/0.9638 | 38.35/0.9724 | 38.67/0.9739 |
| Archwall | 40.15/0.9582 | 39.90/0.9554 | 40.78/0.9636 | 41.16/0.9671 | 41.96/0.9713 | 42.53/0.9754 | 43.55/0.9792 | 43.74/0.9801 |
| auditorium | 27.90/0.8837 | 27.42/0.8717 | 27.92/0.8877 | 29.00/0.9039 | 29.81/0.9168 | 30.27/0.9257 | 31.18/0.9369 | 31.54/0.9414 |
| Band | 33.54/0.9514 | 33.20/0.9471 | 33.85/0.9538 | 34.32/0.9579 | 34.53/0.9584 | 35.49/0.9660 | 36.01/0.9692 | 36.25/0.9704 |
| Caffe | 37.58/0.9647 | 37.02/0.9624 | 38.04/0.9675 | 39.08/0.9715 | 39.77/0.9743 | 41.03/0.9785 | 41.87/0.9809 | 42.09/0.9817 |
| camera | 43.36/0.9886 | 43.58/0.9888 | 43.35/0.9885 | 45.19/0.9905 | 46.02/0.9912 | 47.30/0.9927 | 49.26/0.9941 | 49.85/0.9947 |
| Clap | 34.92/0.9544 | 34.54/0.9511 | 35.40/0.9578 | 36.20/0.9635 | 36.52/0.9646 | 37.70/0.9719 | 38.32/0.9756 | 38.62/0.9768 |
| Lake | 30.63/0.8257 | 30.62/0.8232 | 30.82/0.8323 | 31.15/0.8440 | 31.53/0.8489 | 32.06/0.8730 | 32.53/0.8865 | 32.68/0.8898 |
| photography | 35.94/0.9582 | 35.57/0.9548 | 36.13/0.9592 | 36.60/0.9627 | 37.06/0.9656 | 38.02/0.9719 | 39.00/0.9770 | 39.55/0.9795 |
| polyflow | 36.62/0.9490 | 36.38/0.9452 | 36.98/0.9520 | 37.91/0.9565 | 38.29/0.9581 | 39.25/0.9667 | 40.05/0.9735 | 40.37/0.9756 |
| Average | 35.60/0.9384 | 35.34/0.9348 | 35.87/0.9414 | 36.64/0.9472 | 37.17/0.9507 | 38.05/0.9586 | 39.01/0.9645 | 39.34/0.9664 |

Metrics comprise peak signal-to-noise ratio (PSNR) and structural similarity (SSIM), and test objects are video sequences of 10 general test sets of videos.

As can be seen from Table 1, the method of the disclosure is significantly improved in reconstruction effect compared with the existing methods. Compared with the existing best method (PFNL), the PSNR of the disclosure is improved by 0.33 dB on average, and the SSIM is improved by 0.0019.

Compared with the prior art, the method of reconstruction of super-resolution of video frame provided in the embodiment of the disclosure has the following advantages. On the one hand, since the Deep Neural Network (DNN) has extremely fast feedforward speed, the super-resolution video frame reconstruction method in the disclosure has faster reconstruction speed than traditional optimization-based methods, and is suitable for application scenarios with high real-time requirements.

On the other hand, compared with other video super-resolution networks, the spatial-temporal non-local alignment subnetwork adopted in the method can integrate global information of the consecutive frames, and align such information to every point of the intermediate frame, so as to make full use of information at every point of the consecutive frames. At the same time, this subnetwork makes use of the temporal correlation of the consecutive frames, and also makes full use of the spatial correlation by performing non-local operations on the intermediate frame. Therefore, this method can better utilize the spatial-temporal correlation to integrate and align the information of the consecutive frames, i.e., the intermediate frame, and improve the alignment effect.

Finally, compared with other video super-resolution networks, a subnetwork based on attention progressive fusion adopted in the disclosure can progressively and repeatedly fuse multiple frames, and punish low-quality features at each time of fusion by an attention mechanism, thus improving the final effect of progressive fusion.

It will be obvious to those skilled in the art that changes and modifications may be made, and therefore, the aim in the appended claims is to cover all such changes and modifications.

What is claimed is:

1. A method of reconstruction of super-resolution of a video frame, the method comprising:
   inputting a first video frame with a first resolution and a plurality of consecutive frames thereof into a pre-trained super-resolution reconstruction network, and outputting, by the pre-trained super-resolution reconstruction network, a second video frame with a second resolution corresponding to the first video frame;

wherein:
   the second resolution is higher than the first resolution; and
   the pre-trained super-resolution reconstruction network comprises a feature extraction subnetwork, a spatial-temporal non-local alignment subnetwork, an attention progressive fusion subnetwork, and an up-sampling subnetwork which are connected in sequence;
wherein a training method of the pre-trained super-resolution reconstruction network comprises:
acquiring a training sample set, where the training sample set comprises a plurality of high resolution-low resolution video sequence pairs each comprising 2N+1 third consecutive video frames and a fourth video frame, where N is a positive integer; the third consecutive video frames are low in resolution, and the fourth video frame is high in resolution; the fourth video frame is a high-resolution intermediate frame of the 2N+1 third consecutive video frames, which is an $N+1^{th}$ frame;
inputting the 2N+1 third consecutive video frames into the feature extraction subnetwork to obtain extracted features of the 2N+1 third consecutive video frames output by the feature extraction subnetwork;
inputting the extracted features of the 2N+1 third consecutive video frames into the spatial-temporal non-local alignment subnetwork to obtain aligned extracted features of the 2N+1 third consecutive video frames;
inputting the aligned extracted features of the 2N+1 third consecutive video frames and an extracted feature of the intermediate frame of the 2N+1 third consecutive video frames into the attention progressive fusion subnetwork to obtain a first fused feature of the intermediate frame;
transforming a dimension of the first fused feature of the intermediate frame by the up-sampling subnetwork to obtain a second fused feature of the intermediate frame, where the second fused feature of the intermediate frame is in the same dimension as the fourth video frame;
interpolating the intermediate frame of the 2N+1 third consecutive video frames to obtain an interpolated intermediate frame which is in the same dimension as the fourth video frame;
superimposing the second fused feature of the intermediate frame and the interpolated intermediate frame to obtain a first output frame, and
updating the pre-trained super-resolution reconstruction network to make the first output frame converge to the fourth video frame.

2. The method of claim 1, wherein the feature extraction subnetwork is a convolution network with N_fe convolution layers.

3. The method of claim 1, wherein inputting the extracted features of the 2N+1 third consecutive video frames into the spatial-temporal non-local alignment subnetwork to obtain the aligned extracted features of the 2N+1 third consecutive video frames comprises:
   inputting the extracted features of the 2N+1 third consecutive video frames into the spatial-temporal non-local alignment subnetwork; and
   acquiring, by the spatial-temporal non-local alignment subnetwork, weighted sum features of the extracted features of the 2N+1 third consecutive video frames, as well as the aligned extracted features of the 2N+1 third consecutive video frames based on the extracted feature of the intermediate frame of the 2N+1 third consecutive video frames and the weighted sum features.

4. The method of claim 3, wherein before the spatial-temporal non-local alignment subnetwork acquires the weighted sum features of the extracted features of the 2N+1 third consecutive video frames, the method further comprises transforming a dimension of the extracted features of the 2N+1 third consecutive video frames from a first dimension to a second dimension; and after the weighted sum features are acquired, the method further comprises transforming a dimension of the weighted sum features from the second dimension to the first dimension.

5. The method of claim 1, wherein
   the attention progressive fusion subnetwork comprises N_apf attention progressive fusion blocks connected in sequence; the N_apf attention progressive fusion blocks comprise a first attention progressive fusion block comprising 2N+2 first convolution layers, 2N+2 second convolution layers, and a temporal attention module;
   the first fused feature of the intermediate frame is obtained as follows:
   inputting features corresponding to the 2N+1 third consecutive video frames and a feature of the intermediate frame of the 2N+1 third consecutive video frames into the 2N+2 first convolution layers respectively, inputting all output features into the temporal attention module to obtain an integrated feature of the intermediate frame; cascading the integrated feature of the intermediate frame with the features the 2N+1 third consecutive video frames and the feature of the intermediate frame of the 2N+1 third consecutive video frames, inputting all cascaded features into the 2N+2 second convolution layers, superimposing convoluted features obtained with the features corresponding to the 2N+1 third consecutive video frames and the feature of the intermediate frame of the 2N+1 third consecutive video frames, respectively, and outputting all superimposed features;
   when the first attention progressive fusion block is arranged at a head of the N_apf attention progressive fusion blocks connected in sequence, the features corresponding to the 2N+1 third consecutive video frames are the aligned extracted features of the 2N+1 third consecutive video frames, and the feature of the intermediate frame of the 2N+1 third consecutive video frames is the extracted feature of the intermediate frame of the 2N+1 third consecutive video frames;
   when the first attention progressive fusion block is not arranged at the head of the N_apf attention progressive fusion blocks connected in sequence, the features corresponding to the 2N+1 third consecutive video frames and the feature of the intermediate frame of the 2N+1 third consecutive video frames are superimposed features output by an attention progressive fusion block arranged before the first attention progressive fusion block; and
   when the first attention progressive fusion block is arranged at an end of the N_apf attention progressive fusion blocks connected in sequence, the first attention progressive fusion block further comprises a third convolution layer; and the first attention progressive fusion block cascades superimposed features, inputs the cascade features obtained into the third convolution layer, and takes features output by the third convolution layer as features output by the attention progressive fusion subnetwork.

6. The method of claim 5, wherein inputting all the output features into the temporal attention module to obtain an integrated feature of the intermediate frame comprises:
   calculating, by the temporal attention module, output features corresponding to the 2N+1 third consecutive video frames and an output feature corresponding to the intermediate frame of the 2N+1 third consecutive video frames respectively to obtain similar features in all the output features, multiplying the obtained similar features by the output features corresponding to the 2N+1 third consecutive video frames respectively, and cascading multiplicated features to obtain the integrated feature of the intermediate frame.

7. The method of claim 6, wherein the obtained similar features are calculated based on a sigmoid function.

8. The method of claim 1, wherein the super-resolution reconstruction network is trained in two stages comprising a first stage and a second stage; the temporal attention module is blocked in the first stage and unblocked in the second stage; and the first stage and the second stage are switched based on whether a default convergence threshold is reached in the first stage.

9. The method of claim 1, wherein the up-sampling subnetwork is a convolution network.

* * * * *